Sept. 12, 1950     J. VAN DER HEEM     2,522,075
LOCKING MECHANISM FOR THE HOSE CONNECTING MEMBER FOR SUCTION CLEANERS Filed Jan. 12, 1948     3 Sheets-Sheet 1

Sept. 12, 1950   J. VAN DER HEEM   2,522,075
LOCKING MECHANISM FOR THE HOSE CONNECTING
MEMBER FOR SUCTION CLEANERS
Filed Jan. 12, 1948   3 Sheets-Sheet 2

Inventor:
Jan van der Heem,
By E. F. Wenderoth
atty

Sept. 12, 1950  J. VAN DER HEEM  2,522,075
LOCKING MECHANISM FOR THE HOSE CONNECTING
MEMBER FOR SUCTION CLEANERS
Filed Jan. 12, 1948  3 Sheets-Sheet 3
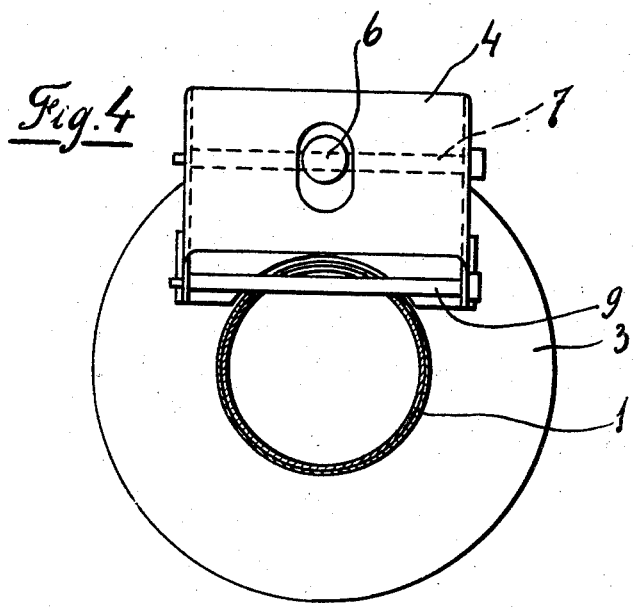
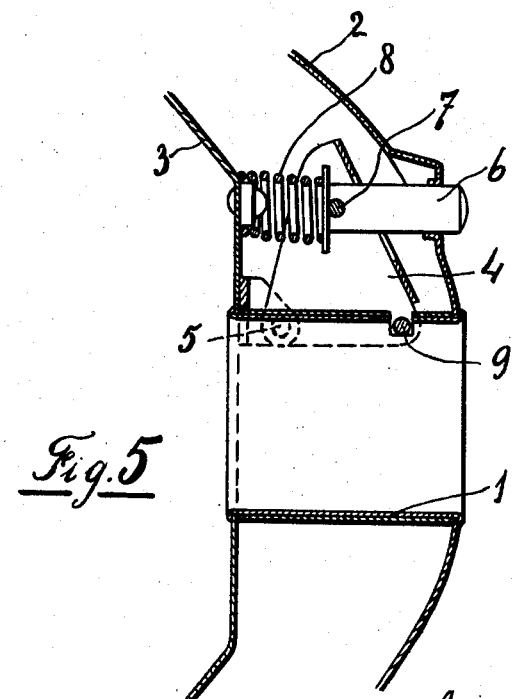
Inventor:
Jan van der Heem,
by C. F. Wenderoth
Atty Patented Sept. 12, 1950

2,522,075

UNITED STATES PATENT OFFICE 2,522,075

LOCKING MECHANISM FOR THE HOSE CONNECTING MEMBER FOR SUCTION CLEANERS

Jan van der Heem, Voorburg, Netherlands, assignor to Van Der Heem N. V., The Hague, Netherlands, a corporation of the Netherlands Application January 12, 1948, Serial No. 1,758
In the Netherlands March 12, 1947

4 Claims. (Cl. 285—169)

1

The invention relates to a locking mechanism for the hose connecting member for suction cleaners.

Various constructions are known for the removably coupling of a hose to a suction cleaner. With these constructions both hands are to be used for fastening, as well as for releasing the hose.

A relatively complicated coupling for a suction cleaner hose which can easily be damaged is known in which for decoupling the hose is pushed inwardly with the one hand, whilst a sleeve mounted on same is displaced outwardly with the other hand, after which the hose is released.

The invention aims at providing a solid, safe construction in which for coupling the hose is pushed into the suction cleaner with only one hand and the coupling is effected and for decoupling merely a pressure (with a cradle-suction cleaner by means of the foot) on the actuating knob needs to be exerted for releasing the lock and removing the hose.

To this end the construction according to the invention is such that a locking member situated laterally with respect to a guiding sleeve for the connecting member enters under spring pressure into a slit of the guiding sleeve and is pushed outwardly by the conical end of the connecting member against the action of a spring, after which it enters in a concentric groove of the connecting member which, if desired, is pivotable, and locks the same, which locking action can be released by displacing the locking member by an external pressure against the action of a spring.

If it is considered to be objectionable that the cam for actuating the locking member is too remote from the hose connecting member owing to which the hose of the suction cleaner body is to be removed with both hands, the actuating knob of the locking member can be placed so close to the connecting opening of the hose of the suction cleaner that the connecting member of the hose can be embraced with the hand and at the same time the knob can be actuated with the thumb of the same hand.

According to the invention to this end the connecting member consists of one or more bell-crank levers a part of which extends through an opening in the guiding sleeve of the hose connecting member, the bell-crank lever being actuated by a part extending outside the hood of the suction cleaner, e. g. a pressure knob or analogous member.

Preferably the part extending through the

2 opening of the guiding sleeve is made as a pivotable pin or sleeve. Owing to this fact this part does not slide along the connecting member but there is a rolling friction owing to which the connecting member slides more easily on the guiding sleeve. The bell-crank lever can be actuated against the action of a spring.

The further features of the invention will appear from the following description.

The invention will be elucidated by the drawing by two embodiments.

Fig. 4 is a front view of a modified locking mechanism.

Fig. 5 is a section of a part of the hood and the locking mechanism.

Figure 1:
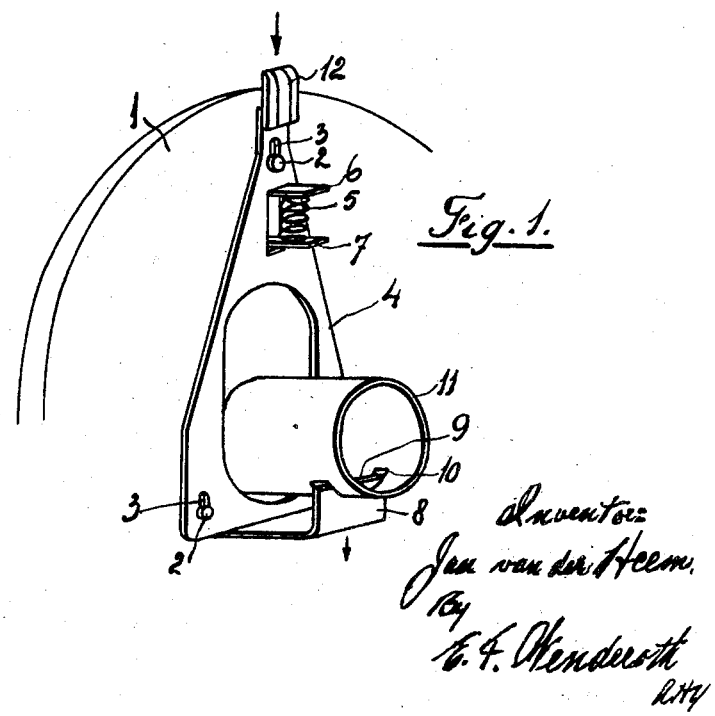
Fig. 1 is a view in perspective of a first embodiment.

With the embodiment according to Fig. 1 a plate 4 is displaceably mounted on the lid 1 by means of guiding bolts 2 and slits 3. The displacement takes place by and against the action of a helical spring 5, situated between a bent part 6 of a plate and a bracket 7 fixed to the lid. The plate possesses a double bent part 8 with edge 9 extending into a slit 10 of the guiding sleeve 11. The plate is provided with an actuating knob 12.

Figure 2:
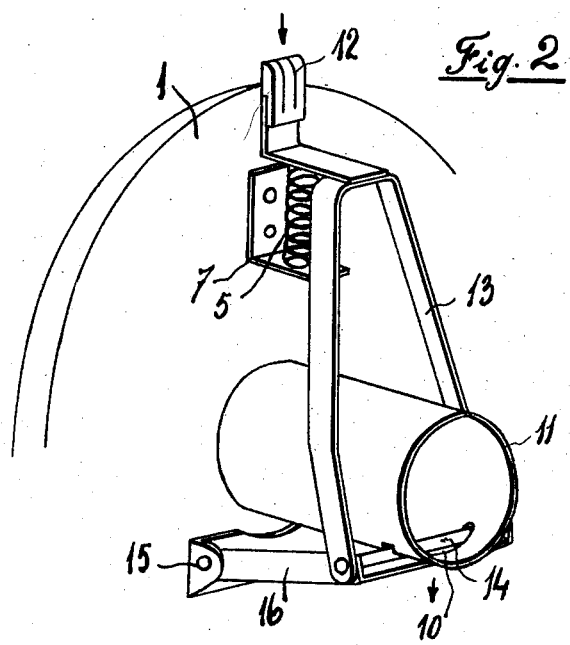
Fig. 2 is a similar view of a second embodiment.
Figure 3:
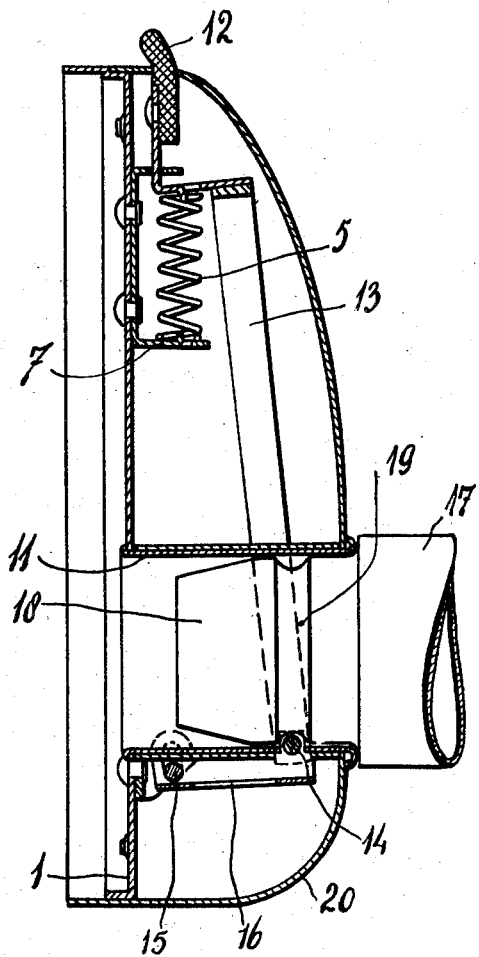
Fig. 3 is a longitudinal section of same.

With the embodiment according to Figs. 2 and 3 the plate is replaced by a bracket 13 with rotatable roll 14 (in order to reduce the frictional resistance) and a rocking member 16 pivotable about the shafts 15. The guiding sleeve 11 is fixed between the lid and the front hood 20.

The hose connecting member 17 has a conical front end 18 and a circumferential groove 19.

The operation of the mechanism is as follows:

If it is desired to couple the hose to the suction cleaner the connecting member 17 is inserted into the sleeve 11. The conical part 18 promotes the ready guiding and centering. In proportion to the connecting member entering more, the edge 9 resp. the roll 14 is pushed more out of the sleeve 11 against the action of the spring 5, until the edge resp. the roll comes at the place of the groove 19; then the edge resp. the roll jumps into the groove and the device is locked.

The lock can be released when the actuating knob 12 is pushed in (with a cradle suction cleaner for instance by the foot), after which the hose can be pulled loose.

With the embodiment according to Figs. 4 and 5, 1 is the guiding sleeve for the hose connecting member, which is connected between the outer wall 2 and the inner lid 3 of the head. The bell crank lever 4 is made as a bracket which is tiltably supported at 5. The pressure knob 6 extends outside the hood adjacent the hose connecting member and is connected to the bracket 4 by means of a pin 7. The pressure knob is fastened to the inner lid 3 by means of a spring 8. The part 9 which extends through the opening in the guiding sleeve 1 is a pin which at both sides is connected with the bracket 4.

Of course this pin can also rigidly be connected with the bracket. Then it is preferred to provide this pin with rotatable sleeve or bushing.

The bracket 4, of course, can also consist of two parts, which then extend inwardly at both sides of the guiding sleeve through openings.

The pressure knob naturally can be made so that it forms a part of the hood and as such possesses an entirely smooth surface with this hood.

I claim:

1. In a locking mechanism for the hose connecting member of suction cleaners, a guiding socket on the suction cleaner, a guiding sleeve on an end of said hose, said guiding sleeve having a conical shaped end thereon, said guiding socket having a transverse slot therein, a locking member movably mounted adjacent said guiding socket, spring means normally urging said locking member into said slot in said guiding socket, means for removing said locking member from said slot against the action of said spring, said guiding sleeve having a groove therein spaced from said conical-shaped end, said conical-shaped end of said guiding sleeve pressing said locking member downwardly against the action of said spring upon insertion in said guiding socket, said locking member being seated in said groove in said guiding sleeve when said sleeve is fully inserted in said socket.

2. In a locking mechanism as claimed in claim 1, said locking member coacting with said slot in said guiding sleeve comprising a rotatably mounted pin.

3. In a locking mechanism as claimed in claim 1, arms pivotally secured to the body of the suction cleaner, said locking member being rotatably mounted on said arms, upwardly extending arms connected to said first named arms, a projection on said upwardly extending arms adapted to extend externally of the body of the suction cleaner and constituting the means for removing said locking member from said slot in said guiding socket against the action of said spring.

4. In a locking mechanism as claimed in claim 1, a hood on said suction cleaner, a bracket tiltably supported above the hose connecting member, said slot in said guiding socket being on the upper side thereof, said locking member being pivotally secured to said tiltably supported bracket, said bracket having an opening therethrough, a pressure knob extending through said opening in said bracket and having an end thereof extending through said hood to the exterior thereof, the other end of said knob being secured to the inner lid of said hood by means of a spring, said knob being connected to said bracket for pivoting said bracket against the action of said spring to remove said locking member from said slot in said guiding socket.

JAN van der HEEM.

REFERENCES CITED

The following references are of record in the file of this patent:

UNITED STATES PATENTS

| Number | Name | Date |
| --- | --- | --- |
| 1,484,528 | Paquette | Feb. 19, 1924 |
| 1,974,476 | Wahl | Sept. 25, 1934 |